(12) United States Patent
Christensen et al.

(10) Patent No.: US 8,836,489 B2
(45) Date of Patent: Sep. 16, 2014

(54) METHOD OF UNAUTHORIZED VEHICLE MOVEMENT DETECTION

(75) Inventors: Jeffrey P. Christensen, Clinton Township, MI (US); Daryl L. Carr, Canton, MI (US); Michael D. Solomon, Novi, MI (US); Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 733 days.

(21) Appl. No.: 12/787,472

(22) Filed: May 26, 2010

(65) Prior Publication Data

US 2011/0291823 A1 Dec. 1, 2011

(51) Int. Cl.
*B60R 25/10* (2013.01)
*B60Q 1/00* (2006.01)
*G01M 17/00* (2006.01)
*G01C 21/00* (2006.01)
*G01S 1/00* (2006.01)
*B60R 25/102* (2013.01)
*B60R 25/33* (2013.01)

(52) U.S. Cl.
CPC ............... *B60R 25/33* (2013.01); *B60R 25/102* (2013.01)
USPC .............. 340/426.1; 340/426.19; 340/426.24; 340/438; 340/440; 701/35; 701/201; 342/350

(58) Field of Classification Search
CPC .... B60R 25/00; B60R 25/33; B60R 25/1004; B60R 16/0233; B60R 2021/01306; G08B 13/00; G08B 19/00; G08B 25/2009; G07C 5/008; G01S 19/16; G01S 5/0027
See application file for complete search history.

(56) References Cited

U.S. PATENT DOCUMENTS

| | | | | |
|---|---|---|---|---|
| 4,536,755 A * | 8/1985 | Holzgang et al. | ........... | 340/573.1 |
| 6,301,533 B1 * | 10/2001 | Markow | ........... | 701/32.4 |
| 6,397,133 B1 * | 5/2002 | van der Pol et al. | ........... | 701/37 |
| 7,289,786 B2 * | 10/2007 | Krasner | ........... | 455/404.2 |
| 7,532,108 B2 * | 5/2009 | Sugie et al. | ........... | 340/426.1 |
| 7,541,915 B2 * | 6/2009 | Takashima et al. | ........... | 340/426.1 |
| 7,545,262 B2 * | 6/2009 | Batchik | ........... | 340/438 |
| 8,099,111 B2 * | 1/2012 | Yi et al. | ........... | 455/456.5 |
| 2002/0115436 A1 | 8/2002 | Howell et al. | | |
| 2005/0137755 A1 * | 6/2005 | Chase et al. | ........... | 701/1 |
| 2007/0080792 A1 * | 4/2007 | Fukagawa et al. | ........... | 340/429 |
| 2007/0268117 A1 * | 11/2007 | Moffett | ........... | 340/426.2 |
| 2009/0088974 A1 * | 4/2009 | Yasan et al. | ........... | 701/213 |
| 2011/0205040 A1 * | 8/2011 | Van Wiemeersch et al. | ........... | 340/426.1 |

FOREIGN PATENT DOCUMENTS

CN 101453534 A 6/2009

* cited by examiner

*Primary Examiner* — George Bugg
*Assistant Examiner* — Renee Dorsey
(74) *Attorney, Agent, or Firm* — Anthony Luke Simon; Reising Ethington P.C.

(57) ABSTRACT

A system and method for detecting unauthorized vehicle movement that includes measuring a resting angle of a vehicle using a vehicle sensor; thereafter, detecting a change in the measured resting angle of the vehicle; determining that the detected change is not authorized; and sending an alert message based on the determination via a vehicle telematics unit.

13 Claims, 2 Drawing Sheets

METHOD OF UNAUTHORIZED VEHICLE MOVEMENT DETECTION

TECHNICAL FIELD

The present invention relates generally to vehicles and more particularly to detecting unauthorized vehicle movement.

BACKGROUND OF THE INVENTION

Increasingly, vehicle manufacturers outfit their vehicles with a wide array of wireless communications capabilities. Telematics units installed in modern vehicles can wirelessly send both voice and data communications to a variety of recipients. Recipients can be central facilities that include servers and/or live advisors capable of responding to the telematics unit. Recipients can also include external callers. Vehicles equipped with telematics units have the ability to monitor and gather a diverse array of data about vehicle related conditions and send it via the telematics unit.

SUMMARY OF THE INVENTION

According to an aspect of the invention, there is provided a method of detecting unauthorized vehicle movement. The steps include measuring a resting angle of a vehicle using a vehicle sensor; thereafter, detecting a change in the measured resting angle of the vehicle; determining that the detected change is not authorized; and sending an alert message based on the determination via a vehicle telematics unit.

According to another aspect of the invention, there is provided a method of detecting unauthorized vehicle movement. The steps include determining that a vehicle has been stationary for a predetermined amount of time; measuring a resting angle of the vehicle using a vehicle sensor; monitoring the resting angle of the vehicle using a vehicle telematics unit to determine if the vehicle is moved; detecting a change in the resting angle based on the monitoring, wherein the change in the resting angle is greater than a predetermined threshold; determining that the change in the resting angle is: (1) present for longer than a predetermined time; or (2) not authorized; and sending an alert message containing a notification of the detected change.

According to yet another aspect of the invention, there is provided an apparatus for detecting unauthorized vehicle movement. The apparatus includes a vehicle telematics unit having an electronic processing device and being operational to provide wireless voice communications, data communications, or both over a wireless carrier system; and a sensor coupled to the vehicle telematics unit and operable to detect an angle of a vehicle with respect to a reference and send the detected angle to the vehicle telematics unit, wherein the vehicle telematics unit operates to monitor the vehicle for changes in the resting angle after the vehicle has remained motionless for a predetermined amount of time and communicate with a call center if the resting angle changes more than a predetermined amount.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT

The method described below detects the unauthorized movement of a vehicle. This can be accomplished by monitoring a motionless vehicle in order to detect some degree of tilting of that vehicle. If the vehicle tilts more than a certain amount, then the vehicle could be moving without the owner's consent. Vehicle telematics units can receive data from sensors that indicated the tilt of the vehicle. Then, the telematics unit can use wireless communications capabilities to send an alert to an appropriate recipient. It is possible to incorporate this method into telematics units installed on vehicles at the factory or telematics units that are later-added to pre-existing vehicles. The method helps increase the chance of recovering stolen vehicles and alerting proper authorities of the theft.

Figure 1:
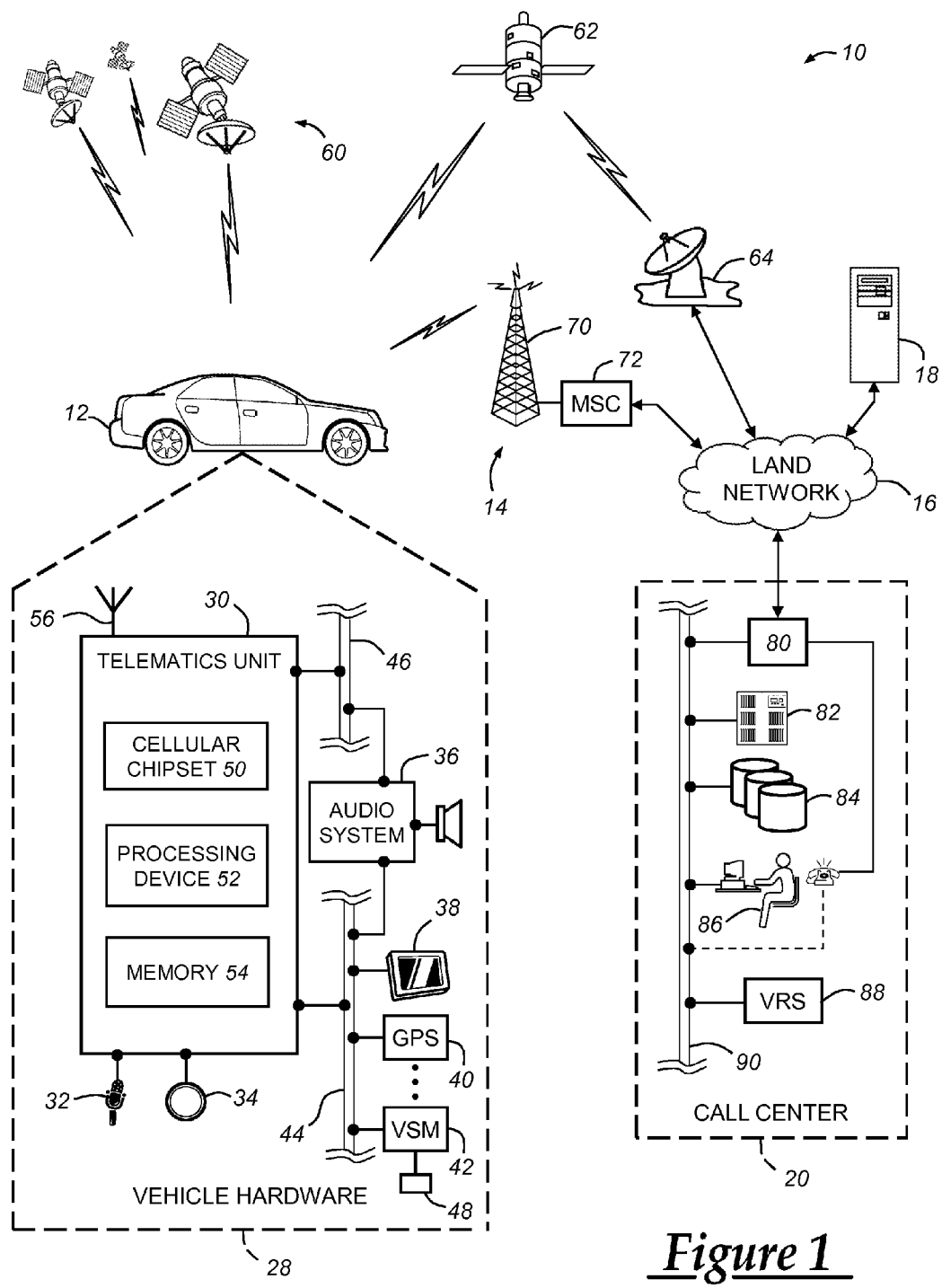
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting, and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. In another example, the VSM 42—or other vehicle hardware component, such as the telematics unit 30—can include an inclinometer 48, such as a tilt sensor, capable of generating an artificial horizon and measuring the angular tilt of the vehicle 12 with respect to that horizon. The inclinometer can be implemented as a liquid capacitive inclinometer or pendular inclinometer, to name a few. It is also possible to measure the tilt of the vehicle 12 using a mercury tilt switch. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
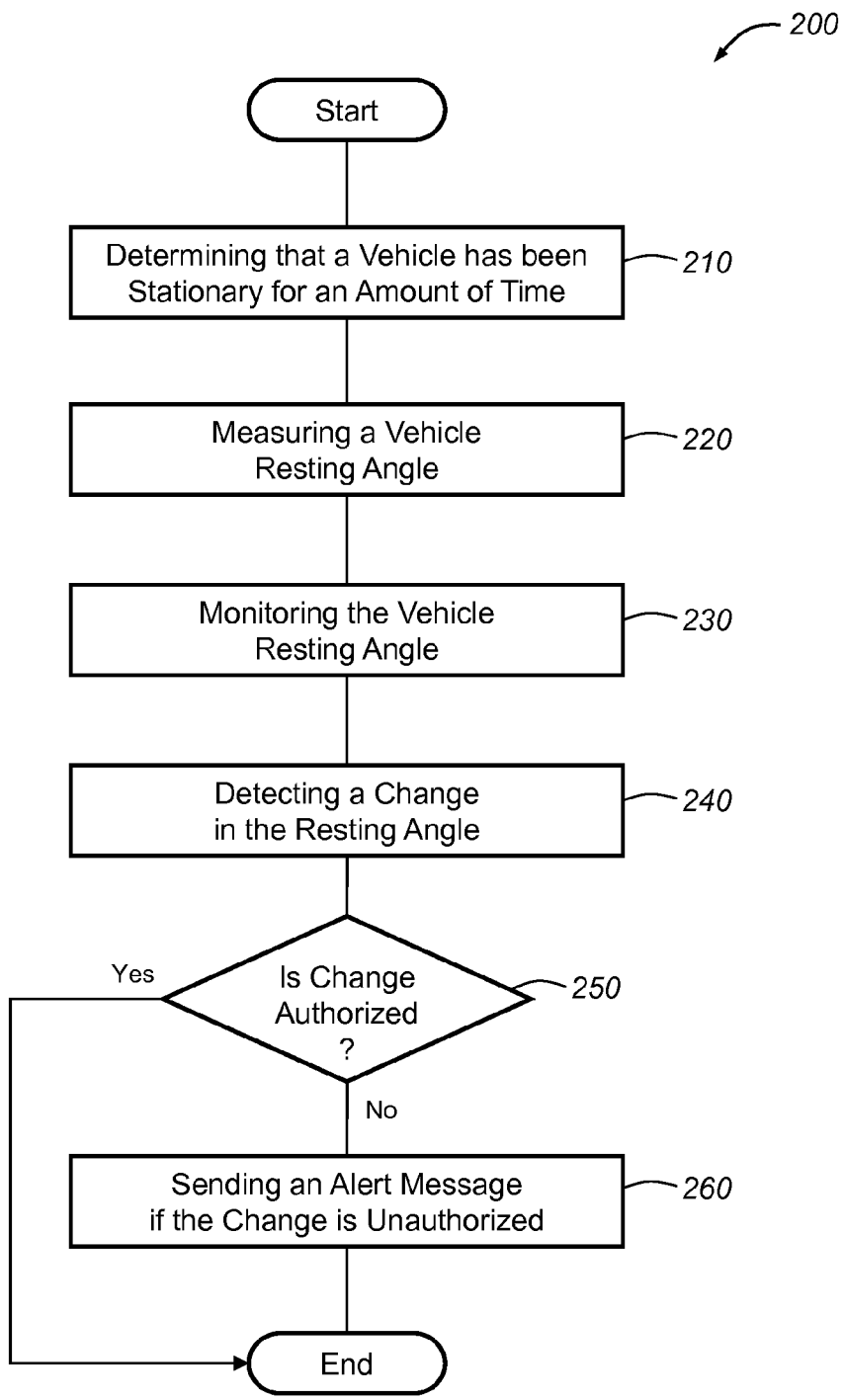
FIG. 2 is a flow chart of a method of detecting unauthorized vehicle movement.

Turning now to FIG. 2, there is a method 200 of detecting unauthorized vehicle movement. The method 200 begins at step 210 with determining that a vehicle has been stationary for a predetermined amount of time. This can take place with some combination of location detecting and timekeeping technology on the vehicle 12. For example, the vehicle 12 includes a GPS module 40 that can generate the latitude and longitude coordinates of the vehicle location. The GPS module 40 can then communicate those coordinates to the telematics unit 30 over the communications bus 44 where they can be analyzed with respect to a change in GPS coordinates over units of time. In that sense, if the GPS coordinates remain unchanged, the telematics unit 30 can include a timing component, such as a clock, that can keep track of the amount of time elapsed during which the GPS coordinates received from the GPS module 40 remain unchanged. If the received GPS coordinates remain the unchanged longer than a predetermined amount of time, then the telematics unit 30 can determine that the vehicle 12 is stationary. An exemplary amount of predetermined time can be two minutes and this amount can be established at a vehicle manufacturing facility or can be wirelessly received at the vehicle 12 as a machine instruction from the call center 20 and saved at the telematics unit 30. In another example, it is possible to determine that the vehicle 12 remains stationary by monitoring a sensor, such as an accelerometer, using the telematics unit 30. If the sensor indicates that the vehicle 12 remains motionless for some period of time, then the telematics unit 30 can detect this condition. The method 200 proceeds to step 220.

At step 220, a resting angle of the vehicle is measured using a vehicle sensor. As described above, the vehicle 12 can include a sensor, such as the inclinometer 48, that measures the angle of the vehicle 12 with respect to some reference, such as the true horizon (e.g., based on gravitational pull) or an artificial horizon such as the ground underneath the vehicle 12. Therefore, when the vehicle 12 comes to a stop, the angle at which the vehicle 12 is articulated with respect to the reference can be measured at that time. In one example, the artificial horizon can differ from the true horizon by an angle value measured between the surface underneath the vehicle and the true horizon. The ground, on the other hand, can be viewed as parallel to the vehicle 12 for purposes of reference and designated as the artificial horizon. For example, if the vehicle 12 is operated in hilly areas and comes to a stop on a hill or incline, the sensor can measure a resting angle of the vehicle 12 as 15° from the true horizon or as 0° from the ground (given that the ground underneath the vehicle 12 is also 15° from the true horizon). In that sense, the sensor can determine that the vehicle 12 rests at 15° and establish 15° as the artificial horizon. While the artificial horizon is 15°, the vehicle 12 is also resting at 15°. Therefore, the vehicle 12 is resting at an angle measured as 0° from the artificial horizon (e.g. the ground). The value 15° is used here as an example and it should be appreciated that many incline values can be determined. Or in another example, when the vehicle 12 comes to stop on an incline, the sensor can measure the resting angle of the vehicle 12 as the angle of the incline with respect to the true horizon. If, for example, the incline is 20° from the true horizon, 20° would be the resting angle of the vehicle 12. The method 200 proceeds to step 230.

At step 230, the resting angle of the vehicle is monitored to determine if the vehicle has moved. Once the resting angle has been measured or established, the vehicle 12 can continue to monitor the angle of the vehicle 12 and compare subsequent measurements of a present angle of the vehicle 12 to the previously-measured resting angle. For example, the resting angle can be stored in memory 54 of the telematics unit 30 and periodically the unit 30 can obtain the present angle of the vehicle 12 via the inclinometer 48 or other sensor. The telematics unit 30 can then compare the present angle of the vehicle 12 with the resting angle. In another example, the resting angle can be stored at the sensor itself and the comparison between the present vehicle angle and the resting angle can occur at the sensor. The comparison can take place periodically until a change is detected or a vehicle operator returns to the vehicle 12—an event that can be signified by such actions as unlocking the doors or activating the vehicle ignition. The method 200 proceeds to step 240.

At step 240, a change in the resting angle is detected based on the monitoring. When the comparison of the resting angle and the present angle do not match or deviate more than a predetermined amount, the telematics unit 30 can detect this discrepancy. For instance, if the comparison between the present vehicle angle and the resting angle occurs at the sensor having the inclinometer, the sensor can send a signal over the communication bus 44 to the telematics unit 30 that alerts the processing device 52 of the discrepancy. In another example, the telematics unit 30 can receive the present angle of the vehicle 12 from the sensor and compare that angle to the resting angle the unit 30 previously stored. In that case, the telematics unit 30 can use the processing device 52 to detect the difference between the resting angle and the present angle. In addition, the telematics unit 30 can determine that the difference between the resting angle and the present angle is greater than a predetermined threshold. In order to help prevent unintended triggering of detected differences, an angle amount can be established as a predetermined threshold above which a change or discrepancy can be considered valid. For example, the predetermined threshold could be a value of 5°. In that sense, if the difference between the present angle of the vehicle 12 and the resting angle is greater than 5°, the method 200 can be more certain that the vehicle 12 has not been bumped by another vehicle or object. Rather, it can be determined as likely that the vehicle 12 is being moved. The method 200 proceeds to step 250.

At step 250, a check is made to determine whether the detected change in the resting angle is authorized or not. In one embodiment, a time period can be used for this determination. For example, it is helpful to determine that the vehicle 12 is not merely being serviced by a vehicle owner using a garage jack, since such a use would be considered authorized. As a result, the method 200 can include one or more steps to help ensure that the detected change in the resting angle is the result of unauthorized movement. In one example, the telematics unit 30 can set a timer that would measure the amount of time the detected change in the resting angle is present. If the change in the resting angle is still present after the expiration of the timer, then the telematics unit 30 can determine that the vehicle 12 is being moved without authorization. For instance, it can be determined that changing a tire may involve 20 minutes of work. As a result, the timer can be set to expire after 20 minutes have passed. Otherwise, if the vehicle 12 returns to its resting angle or returns to an angle within the threshold described in step 240 before the expiration of the timer, the telematics unit 30 can determine that the vehicle 12 is not being moved.

Alternatively, or additionally, the vehicle 12 can determine whether the change in the resting angle is authorized based on one or more vehicle variables that can be monitored by the telematics unit 30. Examples of these vehicle variables include: the status of the vehicle door locks, the presence of a vehicle key in the surrounding area of the vehicle 12, activation of the vehicle ignition, or the location of the vehicle 12. For instance, if the telematics unit 30 determines that the vehicle doors are unlocked, the telematics unit 30 can determine that the change in the resting angle is not the result of unauthorized activity. In another example, the telematics unit 30 can detect the presence of the vehicle key and/or the operation of the vehicle ignition and from their presence determine that the change in the resting angle of the vehicle 12 is not unauthorized. It is also possible to compare the location of the vehicle 12 with certain predetermined locations after determining the change in the resting angle. As an example, the GPS coordinates of GPS module 40 of the telematics unit 30 can be compared with previously-stored coordinates, such as those corresponding to the vehicle owner's house, place of business, or other stored favorite locations. And if the GPS coordinates generated at the time of the detected resting angle change are at or within a predetermined distance from the previously-stored coordinates, the telematics unit 30 can assume that the vehicle movement is authorized.

Where the vehicle movement is determined to be authorized, the method ends or repeats to check for further changes. However, if the movement is determined to have not been authorized, the method 200 proceeds to step 260 where an alert message is sent based on the determination in step 260. If the telematics unit 30 determines that the vehicle is moving without authorization, the unit 30 can send the alert message to the appropriate recipient(s). For example, the alert message can be sent to the call center 20, the vehicle owner, and/or a public safety access point (PSAP). The alert message can contain a notification that it has detected a change in the vehicle angle and/or that the vehicle has been moved. The alert message can be generated by the telematics unit 30 and sent via the dual antenna 56 over the wireless carrier system 14. The alert message can include vehicle data that represents the present condition of the vehicle, such as the present location of the vehicle 12. In addition, the alert message can direct a call center to monitor the future movement and use of the vehicle 12. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of detecting unauthorized vehicle movement, comprising the steps of:
   (a) measuring a resting angle of a vehicle using a vehicle sensor;
   (b) receiving at the vehicle previously-stored coordinates identifying a vehicle owner's house or place of business;
   (c) thereafter, detecting a change in the measured resting angle of the vehicle, and that the vehicle has not returned to the measured resting angle before a predetermined amount of time has passed;
   (d) comparing current GPS coordinates of the vehicle with the previously-stored coordinates identifying a vehicle owner's house or place of business in response to detecting the change in the measured resting angle;
   (e) determining that the detected change is not authorized when the distance between the current GPS coordinates and the previously-stored coordinates identifying a vehicle owner's house or place of business is greater than a threshold;
   (f) sending an alert message based on the determination via the vehicle telematics unit.

2. The method of claim 1, further comprising the step of communicating the current GPS coordinates to a call center.

3. The method of claim 1, further comprising the step of determining that the vehicle has been stationary for a predetermined amount of time.

4. The method of claim 3, further comprising the step of using an accelerometer to determine that the vehicle has been stationary.

5. The method of claim 1, further comprising the step of measuring the resting angle using an inclinometer.

6. The method of claim 5, wherein the inclinometer measures the resting angle with respect to an artificial horizon or reference.

7. The method of claim 1, wherein step (c) further comprises the step of determining that the change in the measured resting angle of the vehicle is greater than a predetermined angular amount.

8. The method of claim 1, further comprising the step of determining whether vehicle movement is authorized based on one or more vehicle variables monitored by the telematics unit.

9. A method of detecting unauthorized vehicle movement, comprising the steps of:
   (a) determining that a vehicle has been stationary for a predetermined amount of time;
   (b) measuring a resting angle of the vehicle using a vehicle sensor;
   (c) monitoring a global positioning system (GPS) location of the vehicle;
   (d) monitoring the resting angle of the vehicle and the GPS location of the vehicle using a vehicle telematics unit to determine if the vehicle is moved;
   (e) detecting both a change in the resting angle and a change in GPS location based on the monitoring, wherein the change in the resting angle and GPS location is greater than a predetermined threshold;
   (f) determining that the change in the resting angle is present for longer than a predetermined amount of time; and
   (g) sending an alert message containing a notification of the detected change in the resting angle and the present location of the vehicle via the vehicle telematics unit to a call center or a public safety access point (PSAP) when the vehicle has not returned to the resting angle before the predetermined amount of time has passed.

10. The method of claim 9, wherein the vehicle sensor further comprises an inclinometer.

11. The method of claim 9, further comprising the step of measuring the resting angle using an artificial horizon.

12. The method of claim 9, further comprising the step of determining whether vehicle movement is authorized based on one or more vehicle variables monitored by the telematics unit.

13. The method of claim 12, wherein the vehicle variables further comprise one or more of: the status of vehicle door locks, the presence of a vehicle key in the surrounding area of the vehicle, activation of the vehicle ignition, or a location of the vehicle.

\* \* \* \* \*